(12) United States Patent
Taylor

(10) Patent No.: US 11,400,778 B2
(45) Date of Patent: Aug. 2, 2022

(54) TRAILER POSITIONING APPARATUS

(71) Applicant: Nick Taylor, Richland Springs, TX (US)

(72) Inventor: Nick Taylor, Richland Springs, TX (US)

( * ) Notice: Subject to any disclaimer, the term of this patent is extended or adjusted under 35 U.S.C. 154(b) by 0 days.

(21) Appl. No.: 17/067,743

(22) Filed: Oct. 11, 2020

(65) Prior Publication Data

US 2021/0107326 A1  Apr. 15, 2021

Related U.S. Application Data

(60) Provisional application No. 62/914,452, filed on Oct. 12, 2019.

(51) Int. Cl.
*B60D 1/40* (2006.01)

(52) U.S. Cl.
CPC ..................... *B60D 1/40* (2013.01)

(58) Field of Classification Search
CPC ........................................ B60D 1/40
See application file for complete search history.

(56) References Cited

U.S. PATENT DOCUMENTS

| | | | |
|---|---|---|---|
| 3,439,764 A | 4/1969 | Kimball | |
| 3,482,847 A | 12/1969 | Hart | |
| 3,767,230 A | 10/1973 | De Vries | |
| 5,016,900 A | 5/1991 | Mccully | |
| 5,180,182 A | 1/1993 | Haworth | |
| 5,188,385 A * | 2/1993 | Wilson | B60D 1/40 280/477 |
| 5,338,047 A | 8/1994 | Knisley | |
| 5,454,582 A | 10/1995 | Rines | |
| 6,726,235 B2 | 4/2004 | Mccarty | |
| 6,758,291 B1 | 7/2004 | Koch | |
| 7,057,498 B1 | 6/2006 | Cook et al. | |
| 7,506,886 B2 | 3/2009 | Warnock | |
| 10,118,657 B2 * | 11/2018 | Dupay | B62D 53/0807 |
| 2002/0185838 A1 | 12/2002 | Shilitz et al. | |
| 2003/0116075 A1 | 6/2003 | Darras | |
| 2006/0125209 A1 | 6/2006 | Lebouef | |
| 2006/0261574 A1 | 11/2006 | Milner et al. | |
| 2007/0108731 A1 | 5/2007 | Mcbroom | |
| 2010/0039515 A1 | 2/2010 | Dietz | |
| 2014/0151979 A1 | 6/2014 | Puckett | |
| 2015/0040692 A1 * | 2/2015 | Gan | F04B 47/022 74/29 |
| 2015/0137483 A1 * | 5/2015 | Morga | B60D 1/52 280/477 |

FOREIGN PATENT DOCUMENTS

WO    WO-2021026524 A1 *  2/2021  ............. B60D 1/245

* cited by examiner

*Primary Examiner* — Kevin Hurley
(74) *Attorney, Agent, or Firm* — Fraley Patent Law, PLLC

(57) ABSTRACT

A trailer positioning apparatus for aiding in aligning a trailer with a tow vehicle is disclosed. The apparatus comprises a pinion plate which is attached to the landing gear of a trailer; and a rack plate for contacting the ground. The rack plate and pinion plate are pivotally attached at one end. At another end, a pinion engages a series of holes in the rack plate in order to create relative movement between the rack plate and the pinion plate when a force is applied by a user. The trailer may be moved into alignment with the tow vehicle, simplifying the process of attaching the trailer to the tow vehicle.

12 Claims, 5 Drawing Sheets

TRAILER POSITIONING APPARATUS

CROSS-REFERENCE TO RELATED APPLICATION

This application claims priority to U.S. Provisional Application No. 62/914,452, which was filed on Oct. 12, 2019, which is incorporated by reference herein in its entirety.

FIELD OF THE INVENTION

This invention is in the general field of trailer vehicles, specifically directed to an apparatus for adjusting the position of a trailer.

BACKGROUND

Trailers are widely used to allow a tow vehicle to transport a wide variety of goods such as raw materials, consumer products, housing, and livestock. This trailer and tow vehicle system is advantageous because the tow vehicle may be disconnected from the trailer quickly to optimize the utility of both the tow vehicle and trailer. Connecting a tow vehicle to a trailer can be challenging, however. A tow vehicle driver must maneuver the tow vehicle into alignment with the trailer. This is difficult to do because the driver must be seated in the vehicle to move the vehicle, making it difficult to see the trailer connection, which is usually behind the driver and obscured by the vehicle.

Many devices have been developed to help align a tow vehicle and trailer. Some systems use cameras; however, these systems can be expensive, and the image can be difficult to see in unfavorable conditions such as rain. Other devices have been developed which consist of rods that attach to the tow vehicle and the trailer and extend upwards or sideways into the field of view of the driver. These devices are cumbersome, however, because they must be attached and removed before and after use, in addition to being difficult to see in unfavorable conditions such as at dark and in the rain.

It would therefore be advantageous to have a device which avoids these and other drawbacks of existing methods and devices.

SUMMARY OF THE INVENTION

A trailer positioning apparatus is provided that is capable of moving a trailer short distances to aid in positioning it for attachment to a tow vehicle. The user need only get the tow vehicle in approximate position, exit the vehicle, and use the trailer positioning apparatus to move the trailer into alignment with the tow vehicle.

A trailer positioning apparatus according to one embodiment comprises a rack plate and a pinion plate pivotally attached at one end. At another end, the rack plate has a series of holes (i.e. a rack) and the pinion plate has provisions for accepting a pinion thereto. A handle having a pinion may then be connected to the rack plate and pinion plate so as to provide leverage for producing relative movement between the rack plate and the pinion plate.

The trailer positioning apparatus is designed to sit between the landing gear (i.e. jack) of a trailer and the ground such that the trailer rests on the trailer positioning apparatus. Thus, when a user moves the trailer positioning apparatus, the entire trailer is moved with respect to the ground.

The handle may comprise a ratcheting mechanism for controlling the motion of the pinion. The ratcheting mechanism allows the user to use repetitive short strokes of the handle to create larger movements of the pinion. The ratcheting mechanism may comprise a spring-loaded pawl that engages with the teeth of the pinion.

A trailer positioning apparatus according to another embodiment comprises a hydraulic cylinder attached to a pivoting foot at the base of the landing gear. The foot has a flat surface flanked by curved surfaces for contacting the ground. A user wishing to move the trailer actuates the hydraulic cylinder, causing the foot to rotate. The trailer moves positions as the foot rolls along the ground.

Yet another embodiment of a trailer positioning apparatus comprises two hydraulic cylinders each capable of rotating a pivoting foot in one of two orthogonal axes to provide positioning of the trailer in two dimensions.

DETAILED DESCRIPTION

Attaching a trailer to a tow vehicle presents a challenge due to poor visibility from the driver's position. Many devices have been developed to solve this problem; however, these devices may be unreliable, expensive, and partially or completely ineffective in darkness or inclement weather. To solve these and other problems, a trailer positioning apparatus is provided herein. Such a trailer positioning apparatus may be semi-permanently attached to the landing gear of a trailer. A user may then use the trailer positioning apparatus to adjust the position of a trailer to facilitate hitching the trailer to the tow vehicle.

Figure 1A:
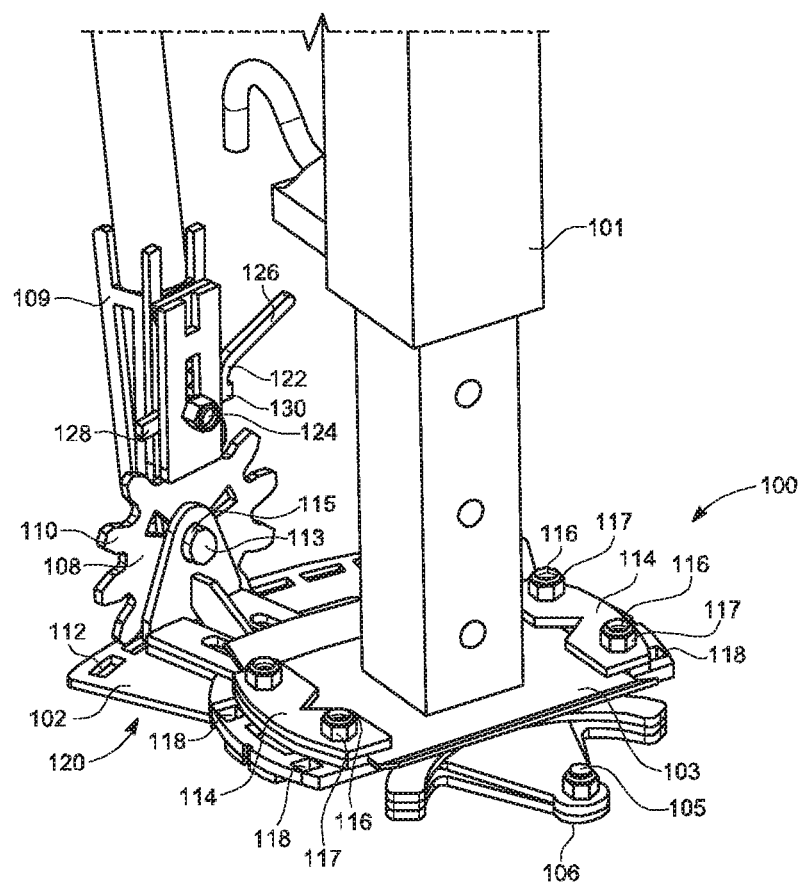
FIG. 1A depicts a trailer positioning apparatus attached to landing gear of a trailer according to one embodiment.
Figure 1B:
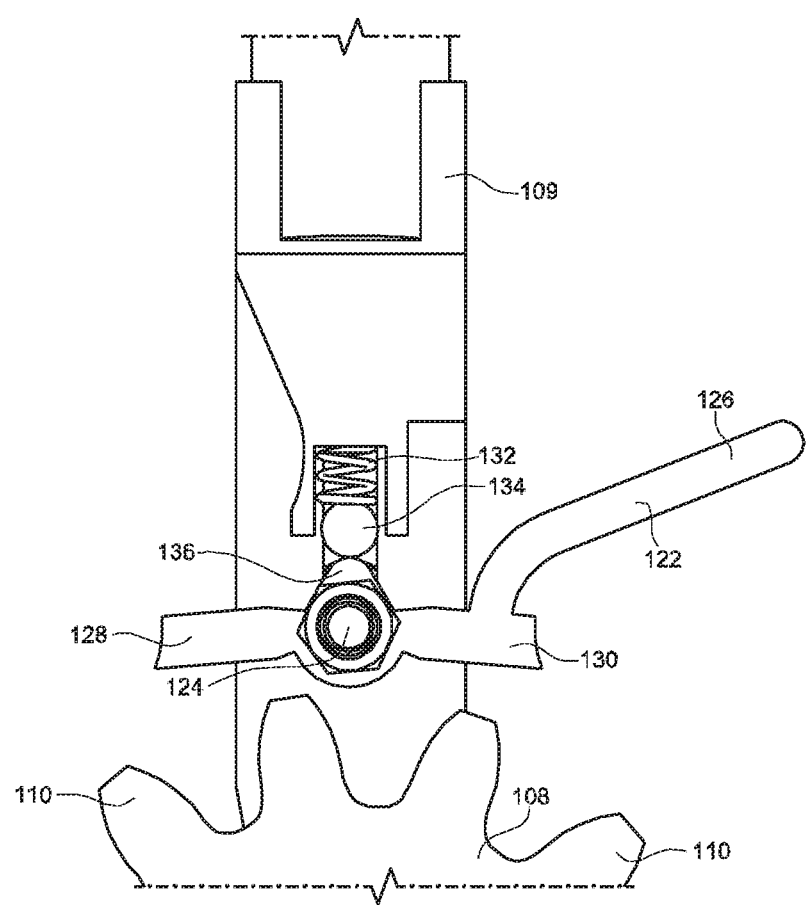
FIG. 1B depicts a ratcheting system of a trailer positioning apparatus according to an embodiment.
Figure 1C:
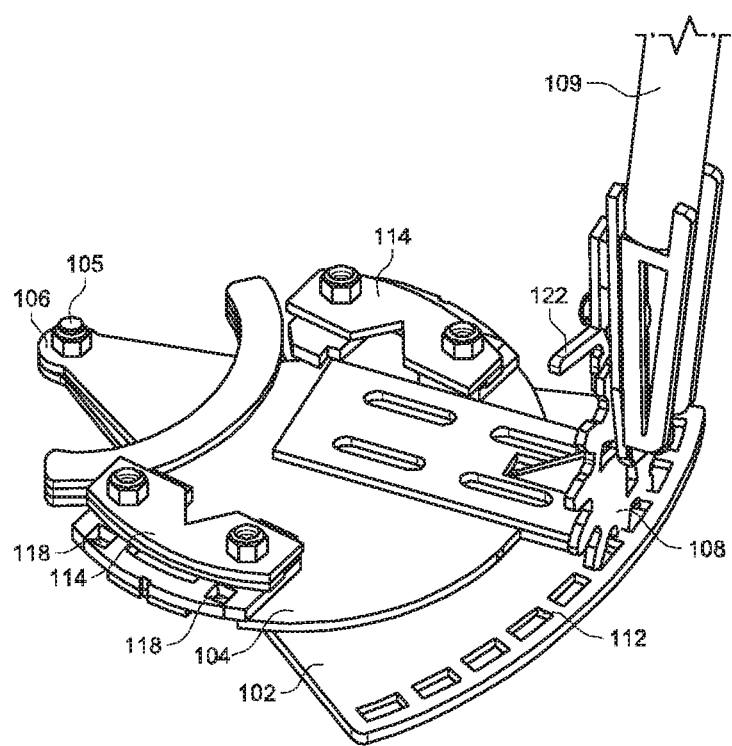
FIG. 1C depicts a different perspective of the trailer positioning apparatus of FIG. 1A without trailer landing gear attached.

Turning now to FIGS. 1A-C, an embodiment of a trailer positioning apparatus 100 is shown. Trailer positioning apparatus 100 is shown attached to trailer landing gear 101, and more specifically to trailer landing gear base plate 103, which normally contacts the ground when the trailer is detached from a vehicle. When trailer positioning apparatus 100 is connected to trailer landing gear 101, trailer positioning apparatus 100 contacts the ground instead. This arrangement allows trailer positioning apparatus 100 to move the trailer with respect to the ground to aid in aligning the trailer to the tow vehicle.

Trailer positioning apparatus 100 is comprised of a rack plate 102 and a pinion plate 104 pivotally connected by a threaded fastener 105 at pivot 106. Rack plate 102 and pinion plate 104 comprise flat thin plates and may move with respect to each other about pivot 106. A pinion 108 is connected to handle 109 which is used to adjust the trailer position. Alternatively, pinion 108 can be attached to pinion plate 104. Pinion 108 comprises a series of teeth 110 which engage a series of holes 112 (i.e. a rack) in rack plate 102. Pinion 108 is attached to handle 109 by a threaded fastener and acorn nut 113, which allows pinion 108 to rotate around the threaded fastener. Handle 109 is used to move the trailer and may be disconnected from the rest of the apparatus and stored when not being used.

When the user wishes to move the trailer with the trailer positioning apparatus, the user installs handle 109 as follows. First, teeth 110 of pinion 108 are inserted into the series of holes 112 on rack plate 102. Handle 109 is then manipulated to allow acorn nut 113 to pass through pinion hole 115 in a vertical portion of pinion plate 104. Acorn nut 113 thus acts to couple pinion 108 (and handle 109) to pinion plate 104. A user may then use handle 109 as a lever to move the trailer.

When the user pushes or pulls on handle 109, teeth 110 engage with the series of holes 112, causing the pinion 108 to rotate. As pinion 108 rotates, force is applied between the rack plate 102 and the pinion plate 104, causing relative motion between the two about pivot 106. Acorn nut 113 and pinion hole 115 act to keep teeth 110 engaged with the series of holes 112 when force is applied to the handle 109, preventing the teeth 110 from slipping out of holes 112 during use. Series of holes 112 is in the shape of a circular arc having pivot 106 at the center of the arc, thus pinion 108 also travels in an arc around pivot 106.

Landing gear clamps 114 have L-shaped cross sections and are designed to hold trailer positioning apparatus 100 onto trailer landing gear base plate 103. Landing gear clamps 114 may be formed from two or more 2-D shapes cut from metal. Landing gear clamps 114 are attached to pinion plate 104 via threaded fasteners 116 and nuts 117 which pass through holes in each landing gear clamp. Holes 118 in pinion plate 104 are designed to allow threaded fasteners 116 to pass through. A plurality of holes 118 may be in pinion plate 104, allowing landing gear clamp 114 to be placed in multiple positions in order to accommodate a variety of trailer landing gear. Holes 118 may also comprise rectangular slots to allow landing gear clamp 114 to be adjusted along the length of the slot. To install trailer positioning apparatus 100 onto trailer landing gear 101, a user places the trailer landing gear base plate 103 between the landing gear clamps 114 and the pinion plate 104. The landing gear clamps 114 are moved into the desired position over the trailer landing gear base plate 103 and nuts 117 are tightened, securing the trailer positioning apparatus 100 to the trailer landing gear 101.

A plurality of feet 120 are attached to the bottom (ground-contacting side) of rack plate 102. Feet 120 may be small, flat plates that are welded onto plate 102 to provide clearance for teeth 100 to protrude through the series of holes 112. Feet 120 may also adjust the device's grip on the ground.

Handle 109 is used for manipulating the trailer's position through the use of leverage applied between the rack plate 102 and pinion plate 104 (e.g., via pinion 108). Handle 109 may be canted outward so as to provide clearance for the landing gear 101. Handle 109 also comprises a ratcheting mechanism (See FIG. 1B) to make positioning the trailer less cumbersome. The ratcheting mechanism comprises a spring-biased pawl 122 which can be set to allow rotation in a first direction only, a second direction only, or both directions. Pawl 122 is pivotally mounted to handle 109 by threaded fastener 124. A handle 126 can be used to manipulate pawl 122 to select the desired operating position. Pawl 122 has two arms, first arm 128, and second arm 130 which interact with teeth 110 to restrict movement of pinion 108. Spring 132 and ball 134 are held within a rectangular cavity in the ratcheting mechanism and serve to both hold pawl 122 in the selected position as well as provide the ratcheting action. When handle 126 is raised, first arm 128 lowers in between teeth 110, held in place by spring 132. Lobe 136 is designed to hold pawl 122 in the selected position during use while allowing the user to change the position quickly and easily. Pinion 108 is prevented from moving clockwise by first arm 128. Pinion 108 can, however, move counterclockwise. Counterclockwise movement of pinion 108 causes one of teeth 110 to push on the underside of first arm 128, causing the pawl 122 to lift and/or rotate. As the tooth clears the first arm 128, the arm lowers back in place between the teeth 110.

When handle 126 is lowered, second arm 130 is lowered towards teeth 110. Pawl 122 then functions as explained above except in this case, pinion 108 is prevented from moving counterclockwise and may only move clockwise.

One or more centering springs (not shown) may be attached to the rack plate and pinion plate to keep the plates in a preferred position when the landing gear is up. The centering spring(s) may be strong enough to push the rack plate in the approximate center of the pinion plate travel when the landing gear is up. This ensures that there will be movement available in both directions each time the trailer is disconnected, facilitating reconnection in the future.

Having pinion 108 attached to handle 109 has several benefits. Trailer positioning apparatus 100 has a simpler design, resulting in less weight and cost to manufacture. A user may attach several trailer parking apparatuses to different trailers but need only one handle. Additionally, the handle and pinion can be stored in the tow vehicle, reducing the likelihood of rusting or damage.

In another embodiment, the pinion may be attached to the pinion plate. A handle may engage the pinion to move the trailer. In yet another embodiment, the pinion may be powered. In this powered embodiment, a handle may not be used and the pinion is attached to the pinion plate. The pinion is coupled to a motor which may be driven hydraulically, pneumatically, electrically, or by any other known means to turn the pinion and move the trailer.

Figure 2:
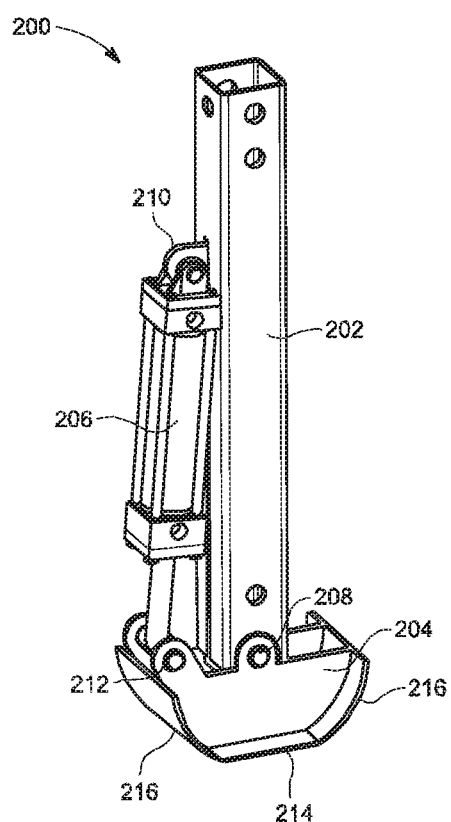
FIG. 2 depicts a hydraulic trailer positioning apparatus according to one embodiment.

FIG. 2 shows an embodiment of a hydraulic trailer positioning apparatus 200. Hydraulic trailer positioning apparatus 200 attaches to the landing gear 201 of a trailer and functions to move the trailer short distances using hydraulic cylinders. Other types of actuators may be used, such as pneumatic or electric cylinders. Hydraulic trailer positioning apparatus 200 may be powered by the trailer, the tow vehicle, or by a separate power source.

A tube 202 connects to the trailer, allowing hydraulic trailer positioning apparatus 200 to take the place of at least a portion of the trailer's existing landing gear and pad. Foot 204 is pivotally attached to the lower end of tube 202 and can manipulated by hydraulic cylinder 206 to move the trailer small distances. Pin 208 passes through holes in foot 204 and tube 202 to secure foot 204 to tube 202 while allowing foot 204 to rotate about the axis of pin 208. Hydraulic cylinder 206 is pivotally coupled to tube 202 at end 210 by a clevis attachment. The rod of hydraulic cylinder 206 is pivotally connected at end 212 by a pin which passes through holes in foot 204.

Foot 204 has a flat surface 214 between two curved surfaces 216. In the neutral position, flat surface 214 contacts the ground. Actuating the hydraulic cylinder 206 causes foot 204 to pivot about pin 208. As foot 204 pivots, contact with the ground shifts from flat surface 214 to one of the curved surfaces 216. As the foot 204 rolls along the ground, the trailer moves positions. The amount of movement of the trailer is determined by how far the hydraulic cylinder is moved.

Figure 3:
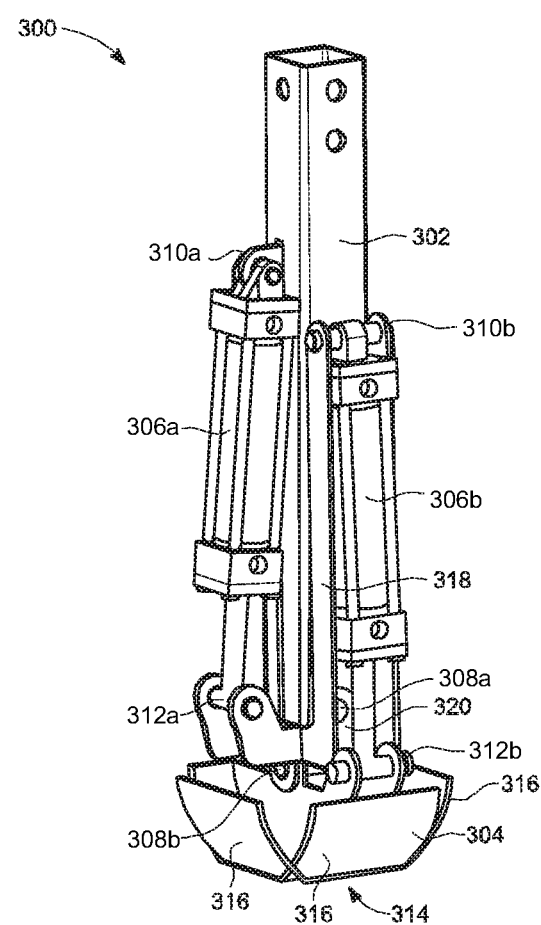
FIG. 3 depicts a hydraulic trailer positioning apparatus according to another embodiment.

FIG. 3 shows another embodiment of a hydraulic trailer positioning apparatus 300. Hydraulic trailer positioning apparatus 300 functions similar to the embodiment shown in FIG. 2, with the addition of a second hydraulic cylinder to allow the trailer to be moved in two dimensions rather than just one.

Hydraulic trailer positioning apparatus 300 is comprised of a tube 302 which is connected to the trailer. Foot 304 is connected to tube 302 such that it can pivot in two directions. Movement of the trailer is accomplished by actuating one or both of hydraulic cylinders 306a and 306b. Unlike the embodiment in FIG. 2, foot 304 is not connected directly to tube 302. Instead, intermediate connector 320 connects to both tube 302 and foot 304 by two pins 308a and 308b orthogonally arranged. Foot 304 is thus able to pivot around the two axes, around the axis of pin 308a and also around the axis of pin 308b.

Hydraulic cylinder 306a is connected to tube 302 at end 310a. Rod end 312a of hydraulic cylinder 306a is pivotally attached to intermediate connector 320. Hydraulic cylinder 306b is attached to arms of intermediate connector 320 at end 310b. Rod end 312b of hydraulic cylinder 306b is pivotally attached to foot 304. Actuating hydraulic cylinder 306a causes intermediate connector 320 and foot 304 to pivot around the axis of pin 308a. As hydraulic cylinder 306b is connected to intermediate connector 320, hydraulic cylinder 208b also moves. Actuating hydraulic cylinder 308b causes foot 304 to pivot around the axis of pin 308b.

Foot 304 has a flat surface 314 that contacts the ground in the neutral position and multiple curved surfaces 316 designed to contact the ground when the trailer is being moved with the hydraulic cylinders. When the user wished to move the trailer, one or both hydraulic cylinders are actuated by a control system, causing foot 304 to pivot and roll onto one or more curved surfaces 316. Thus, each cylinder is responsible for moving foot 304 around one of the two orthogonal axes, resulting in independent, variable control of the position of the trailer within a two-dimensional area.

Other embodiments besides those shown are contemplated. For example, instead of landing gear clamps, the trailer positioning apparatus may be designed to be welded to the landing gear. In another embodiment, a trailer positioning apparatus may be built into the landing gear of the trailer. A trailer positioning apparatus may be used on any type of trailer connection, including fifth wheel, gooseneck hitches, and bumper pull hitches.

May trailers have more than one set of landing gear or jacks. For such trailers, one trailer positioning apparatus may be used on each jack. Mechanical means, such as tie rods, may be used to synchronize the motions of the multiple trailer positioning apparatuses. In the case of powered apparatuses, the hydraulic, pneumatic, or electric controls may be connected to multiple positioning apparatuses to synchronize the motions.

Many components of trailer positioning apparatus can be formed by cutting two-dimensional shapes out of metal and attaching them together, where necessary, by use of welds, adhesives, rivets, or threaded fasteners. Metal shapes can be cut using laser, plasma, or stamping, allowing for inexpensive precision component fabrication.

The threaded fasteners referred to in this disclosure may be any known type of threaded fastener, including carriage bolts. Carriage bolts are particularly useful as the square part of the carriage bolt head may engage square holes or rectangular slots in the apparatus, allowing the fasteners to be tightened using one wrench to turn the nut only. Locknuts may be used to reduce the likelihood of undesired loosening of the nuts.

The discussion herein of the present invention is directed to various embodiments of the invention. The term "invention" is not intended to refer to any particular embodiment or otherwise limit the scope of the disclosure. Although one or more of these embodiments may be preferred, the embodiments disclosed should not be interpreted, or otherwise used, as limiting the scope of the disclosure, including the claims. In addition, one skilled in the art will understand that the description has broad application, and the discussion of any embodiment is meant only to be exemplary of that embodiment, and not intended to limit that the scope of the disclosure, including the claims, is limited to that embodiment.

Herein, the terms "including," "consisting of", and "comprising" are used in an open-ended fashion, and thus should be interpreted to mean "including, but not limited to." Also, the term "connect" or "connected" where used if at all is intended to mean either an indirect or direct connection. Thus, if a first component connects to a second component, that connection may be through a direct connection or through an indirect connection via other components and connections.

Certain terms are used throughout the description and claims to refer to particular system components and method steps. As one skilled in the art will appreciate, different companies may refer to a component by different names. This document does not intend to distinguish between components that differ in name but not function.

It is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A trailer positioning apparatus, comprising:
   a rack plate having a rack at a first end of the rack plate and a pivot at a second end of the rack plate; and
   a pinion plate having a portion for attaching a pinion to a first end of the pinon plate and a pivot at a second end of the pinion plate, wherein the rack plate and pinion plate are pivotally connected at the pivot at the second end of the rack plate and the second end of the pinion plate.

2. The trailer positioning apparatus of claim 1, further comprising:
   a landing gear clamp connected to the pinion plate for attaching the trailer positioning apparatus to landing gear of a trailer.

3. The trailer positioning apparatus of claim 1, further comprising:
   a handle for manipulating the apparatus.

4. The trailer positioning apparatus of claim 3, wherein the handle comprises:
   a pinion configured to engage with the rack.

5. The trailer positioning apparatus of claim 4, wherein the handle comprises:
   a ratcheting mechanism for controlling the movement of the pinion.

6. The trailer positioning apparatus of claim 5, wherein the ratcheting mechanism comprises:
   a pawl configured to engage the teeth of the pinion; and a spring designed to apply pressure to the pawl to keep the pawl engaged with the pinion.

7. The trailer positioning apparatus of claim 6, further comprising:
a centering spring for keeping the rack plate and the pinion plate in a preferred orientation when the trailer is not in contact with the ground.

8. A trailer positioning apparatus, comprising:
a rack plate having a rack at a first end of the rack plate and a pivot at a second end of the rack plate; and
a pinion plate having a pinion rotatably attached to a first end of the pinon plate and a pivot at a second end of the pinion plate, wherein the rack plate and pinion plate are pivotally connected at the second end of the rack plate and the second end of the pinion plate.

9. The trailer positioning apparatus of claim 8, further comprising:
a landing gear clamp connected to the pinion plate for attaching the trailer positioning apparatus to landing gear of a trailer.

10. The trailer positioning apparatus of claim 8, further comprising:
a pinion handle for manipulating the pinion.

11. The trailer positioning apparatus of claim 8, wherein the pinion comprises teeth and the rack comprises a series of holes configured to engage the teeth of the pinion.

12. The trailer positioning apparatus of claim 8, further comprising:
a centering spring for keeping the rack plate and the pinion plate in a preferred orientation when the trailer is not in contact with the ground.

* * * * *